Patented Sept. 27, 1932

1,879,639

UNITED STATES PATENT OFFICE

WILLSON H. ROWLEY, OF CHARLESTON, WEST VIRGINIA, ASSIGNOR TO EVANS LEAD COMPANY, OF CHARLESTON, WEST VIRGINIA, A CORPORATION OF DELAWARE

COMPOSITION OF MATTER

No Drawing. Original application filed November 7, 1930, Serial No. 494,194. Divided and this application filed December 10, 1931. Serial No. 580,222.

In storage batteries, particularly automobile starting and lighting batteries, much depends upon the negative plates for best capacities. In such batteries there is a tendency of the sponge lead composing the active material of the negative plate to contract, coagulate and weld together the lead particles. As this contraction, coagulation and welding together is more noticeable in cold weather, the capacity of the plates is greatly reduced and sometimes the battery is thereby rendered worthless.

With these facts in mind the present invention is directed to a new material to be used in the making of negative plates of the pasted variety for storage batteries or storage cells, and has for one of its objects the provision of a material which not only promotes separation of the lead particles of the plate mass but maintains this particle separation thereby preventing contraction, coagulation and welding together of the lead particles of the active material in the plate and forming a well cemented plate of high porosity, capacity and efficiency.

My new and improved material also reduces abnormal swelling and dislodging of the active material of the plate from its supporting grid.

A further object of my invention is the provision of a material preferably in a dry powdered form which may be employed by manufacturers of storage batteries or storage cells for incorporation by them in the paste or mix used in making negative plates.

This dry material is not only non-corrosive, but it is easily mixed with battery oxides to give a uniform paste with a minimum of effort. Moreover, by means of this dry material the proportions of the dry material and battery oxides can be more easily adhered to by a workman unskilled in the art of battery making, thereby giving uniform results in production. The dry material also has good keeping qualities, and it can be stored or shipped without deterioration.

More specifically the present invention is directed to a new composition of matter for use in the manufacture of negative plates and storage batteries, this new composition of matter resulting from the mixing of a material, such as lead oxide for example, capable of combining chemically with the acids in the mass which results from treating a fibrous cellulosic carbon-containing material with sulphuric acid.

By way of example I may take 14 ounces of sulphuric acid of specific gravity of 1.400, or thereabouts, heat the same to about 225° F., then add 50 grams of a suitable fibrous cellulosic carbon-containing material, such as hemp, for example, to the acid, and after the cellulosic material has become thoroughly incorporated with the acid I maintain the heat for a suitable period of time (say from five to ten minutes) until the cellulosic material has become partially carbonized but still retaining a fibrous condition.

The treatment of hemp or other suitable fibrous cellulosic material with sulphuric acid, as above set forth, not only produces a partially-carbonized fibrous cellulosic material but also results in unreacted and reacted sulphuric acid and unreacted and reacted reduction products of the sulphuric acid, partial decomposition products of oxycellulose, and also soluble organic salts, such as sulphonates and sulphates of sugars, which latter are capable of forming lead salts on treatment with lead oxides.

The heating is then discontinued and the resulting mass, preferably when cooled, is mixed with lead oxide in such proportions that all of the liquid of the mass will combine with the oxide. I have found that about 2500 cubic centimeters of the material to 17½ pounds of lead oxide (PbO) will be about the right proportions with the result that the lead oxide not only combines with the unreacted sulphuric acid and the unreacted reduction products but also with the sulphonates of the organic matter carried in the sulphuric acid to form lead sulphonates and/or organic lead salts such as organic lead sulphates.

The thorough agitation and incorporation of the aforesaid material with the lead oxide in a mixer produces a paste-like mass capable in this condition of being incorporated in a plate paste or mix; or, if preferred, the mass may be dried and reduced by a suitable mill to a powder, and in this condition incorporated in the paste or mix used in making negative plates.

I have found that the addition of my improved material to the plate "mix" results in increased sulphation of the lead oxide and an increase in bulking, the latter feature permitting more plates to be made with a given amount of pigment.

I have found also that the incorporation of this material in the mix apparently effects not only a permanent separation of the particles in the material of the finished plate but also an increased particle separation, as compared with results obtained where lampblack, for example, is used.

It is to be noted that my improved material is superior to the materials, such as lampblack for example, heretofore used and known commercially as expanders, in that excessive swelling of the plate is eliminated. This is of advantage because it avoids entirely the danger of the plates swelling to such a degree as to contact with the positive plates and thus cause a short circuit in the battery. It also eliminates sloughing of the active mass from the supporting grid. It further eliminates entirely the difficulty experienced with prior plates when removing the same from the cell and placing them again in position.

While I have referred to lead oxide as a material suitable for carrying out my invention, it is to be understood, however, that other materials such for example as basic lead sulphate or metallic lead powder may be used with good results.

This application is a division of my copending application Serial No. 494,194, filed November 7, 1930.

What I claim is:—

1. A dry composition of matter for addition to the negative plate mix for storage batteries and containing a partially-carbonized cellulosic material, lead sulphate and organic lead salts.

2. A composition of matter for addition to the negative plate mix for storage batteries and comprising a dry powder containing partially-carbonized fibrous cellulosic material, lead sulphate and organic lead salts.

This specification signed this 2nd day of December, 1931.

WILLSON H. ROWLEY.